UNITED STATES PATENT OFFICE.

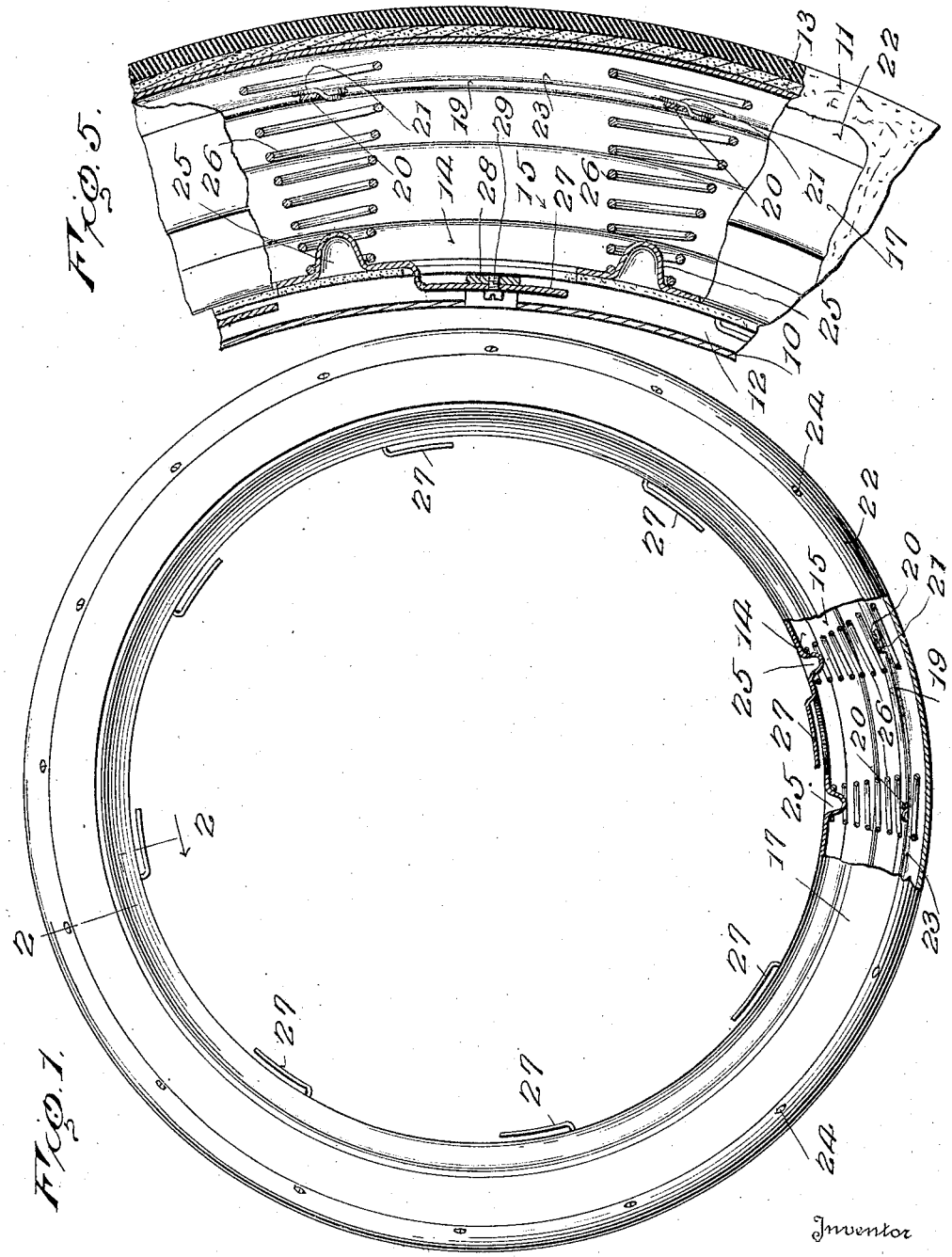
W. E. COOK.
VEHICLE TIRE.
APPLICATION FILED MAR. 22, 1918.
1,304,742.
Patented May 27, 1919.
2 SHEETS—SHEET 1.
Inventor
W. E. Cook
By
Attorneys

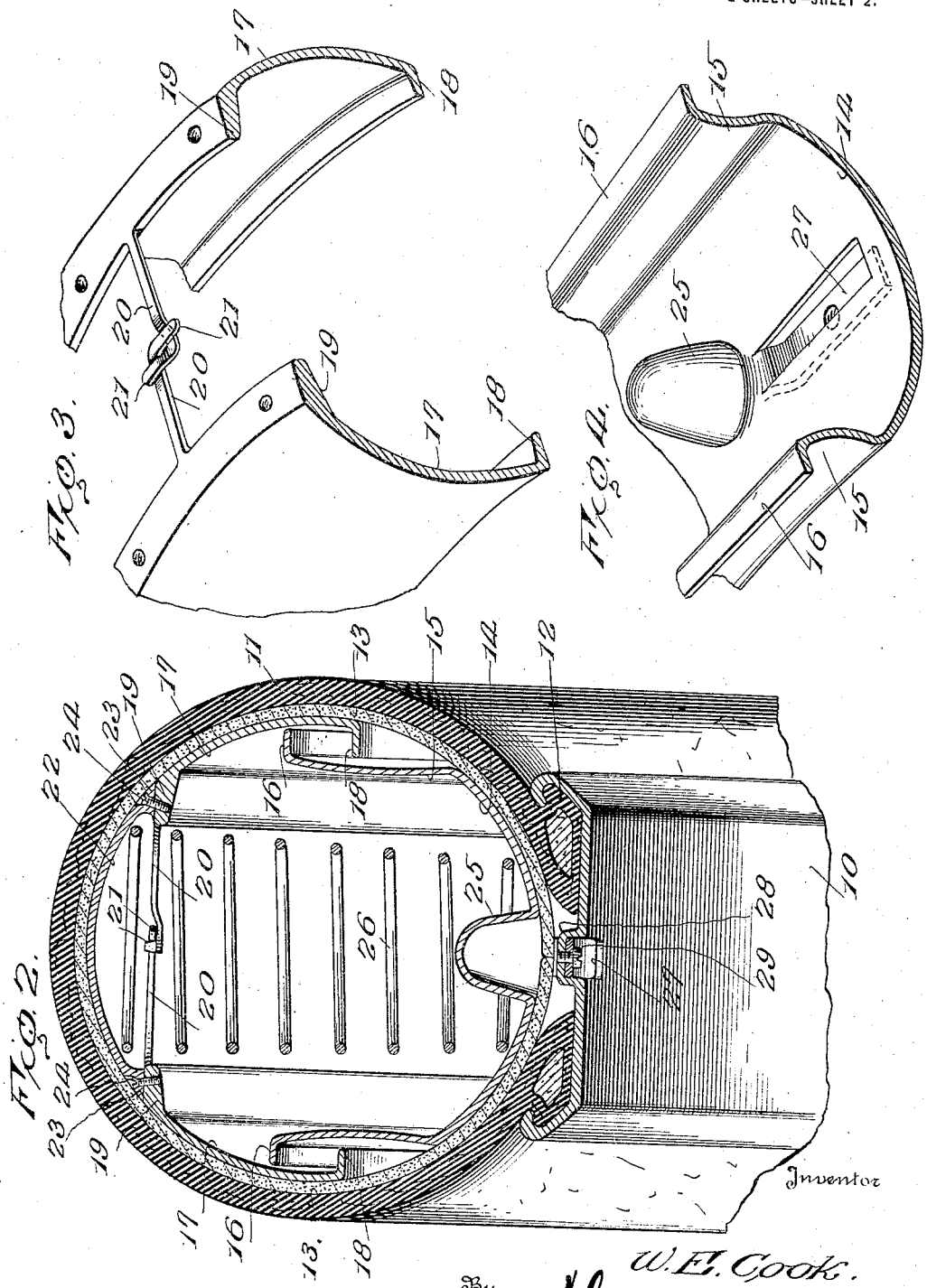

WALTER E. COOK, OF CLEVELAND, OHIO.

VEHICLE-TIRE.

1,304,742.   Specification of Letters Patent.   Patented May 27, 1919.

Application filed March 22, 1918. Serial No. 224,005.

*To all whom it may concern:*

Be it known that I, WALTER E. COOK, a citizen of the United States, residing at Cleveland, in the county of Cuyahoga and State of Ohio, have invented certain new and useful Improvements in Vehicle-Tires, of which the following is a specification.

This invention relates to an improved cushion tire especially designed for motor vehicles and has as its primary object to provide a construction wherein the tire will embody a plurality of cushioning springs for yieldably supporting the load in a manner similar to the ordinary pneumatic tire.

The invention has as a further object to provide a construction wherein the cushioning springs will be housed within a metal inner casing within the outer casing of the tire, and wherein the said inner casing will be formed of detachably connected sections so that the said springs may be readily placed in position or removed.

A still further object of the invention is to provide a construction wherein the sectional inner casing of the tire will include a tread plate yieldably supported to receive the load by the cushioning springs employed.

And the invention has as a still further object to provide a construction wherein the tire will be securely fastened to the demountable rim therefor.

Other and incidental objects will appear as the description proceeds, and in the drawings wherein I have illustrated the preferred embodiment of the invention, and wherein similar reference characters designate corresponding parts throughout the several views:

Figure 1 is a side elevation of the improved tire showing the tire in position upon the rim therefor, this view being partly broken away to show the disposition of the cushioning springs within the tire.

Fig. 2 is a fragmentary sectional view taken on the line 2—2 of Fig. 1 and particularly illustrating the sectional inner casing employed within the outer casing of the tire, Fig. 3 is a fragmentary perspective view of the side plates of the inner casing and illustrating the type of cross arm lock employed between the outer margins of the said plates, Fig. 4 is a fragmentary sectional view showing a portion of the bottom plate of the inner casing and illustrating the type of locking tongue carried thereby for engagement with the rim, and Fig. 5 is a fragmentary sectional view taken at substantially right angles to Fig. 2.

Referring more particularly to the drawings, my improved cushion tire is mounted upon a rim 10 of the demountable type. Secured upon this rim is an outer casing 11 formed with beads 12 to engage the flanges of the rim for connecting the casing thereto. Within the casing is a liner 13 which is preferably formed of an asbestos composition and disposed within this liner is the metal inner casing of the tire. This inner casing is formed of a plurality of sections including an annular bottom plate 14 substantially channel shaped in cross section and formed with inwardly bowed sides 15. At their outer edges the sides of this plate are provided with laterally directed annular flanges or lips 16. Coacting with the bottom plate 14 are transversely curved annular side plates 17. These side plates at their inner margins are provided with inwardly directed annular flanges or lips 18 extending within the flanges of the bottom plate and abutting the bowed sides thereof. At their outer margins the plates 17 are formed with inwardly directed annular flanges 19, which as particularly shown in Fig. 2 of the drawings, are somewhat thickened. Formed on the flanges 19 at suitable points spaced circumferentially thereof, are pairs of coacting cross arms 20 which extend inwardly between the said flanges from the inner edges thereof and are provided at their inner extremities with coacting interengaging hooks 21, detachably connecting the said arms at their inner ends. It will be noted upon particular reference to Fig. 3 of the drawings, that one of the cross arms of each pair is slightly offset adjacent its outer extremity to receive the hook of the other arm of such pair, while the hook of the first arm is also slightly offset to engage over the latter arm, the hooks of each pair of arms being reversely presented. Therefore, when assembling the side plates of the inner casing, the flanges 18 thereof may be fitted within the flanges 16 of the bottom plate 14, when the said side plates may then be rotated with respect to each other for engaging the cross arms of the said side plates with each other. These cross arms are, of course, provided to receive lateral strain upon the outer margins of the side plates and will prevent spreading of the said plates at their outer edges. Extending between the outer edges of the side plates, is a transversely curved annular tread plate 22 which, at its edges, is formed with thickened annular ribs 23 seating upon the flanges 19 of the side plates. Connecting the tread plate with the said side plates, are a plurality of screws or other suitable fastening devices 24, fitted through the ribs 23 at suitable points spaced circumferentially thereof and threaded into the flanges 19. This tread plate may thus be easily mounted upon the side plates after the said side plates have been connected with the bottom plate, in the manner just previously described, and it will consequently be seen that the several sections of the inner casing may, therefore, be readily assembled.

Struck from the bottom plate 14 of the inner casing is a series of circumferentially spaced knobs 25 and engaging at their lower extremities over these knobs is a series of coil cushioning springs 26. These springs are preferably tapered from their outer ends toward their inner ends and the outer extremities thereof are, as particularly shown in Fig. 2, received between the flanges 19 of the side plates 17 of the inner casing, to bear within the tread plate 22 thereof. As particularly brought out in this figure of the drawings, the outer extremities of the coil springs are arranged to intersect the pairs of cross arms 20 which extend beneath the outermost coils of the said springs for thus securing the springs in position. These springs will, therefore, support the side plates and tread plate of the inner casing to float within the casing 11 with respect to the bottom plate 14 of the inner casing, the flanges 18 of the side plates being, as shown in Fig. 2, normally spaced from the flanges 16 of the bottom plate. Consequently, the tread plate may move eccentrically with respect to the bottom plate under the weight of a load upon the tread of the outer casing and will be cushioned in its eccentric movement by the cushioning springs, for thus yieldably supporting the load.

Inwardly struck from the medial portion of the bottom plate 14 of the inner casing is a series of spaced circumferentially extending tongues 27 which project through the liner 13 of the tire and are arranged to slidably engage beneath a series of out struck loops 28 formed from the rim 10. These tongues thus act to connect the bottom plate of the inner casing directly with the rim and will accordingly coact with the beads 12 of the casing 11 for rigidly securing the tire upon the rim. The tongues may, of course, be easily engaged beneath the loops 28 by simply rotating the tire with respect to the rim and locking the said tongues against displacement are screws 29 threaded through the tongues from the inner side of the rim to engage the said loops. It will, therefore, be seen that I provide a particularly simple type of cushion tire and a construction wherein the cushioning springs employed will coact with the floating tread plate of the inner casing of the tire for yieldably supporting the load in a manner similar to the ordinary pneumatic tire. At the same time, the tire is secured upon a demountable rim so that the said tire may be readily placed upon or removed from a vehicle wheel with the rim.

Having thus described the invention, what is claimed as new is:

1. A cushion tire including an outer casing, an inner casing therein and including a bottom plate, a tread plate confronting the tread of the outer casing and mounted to float with respect to the bottom plate, side plates connecting the tread plate with the bottom plate, chordal cross arms extending between the outer margins of the side plates, and hooks carried by the outer extremities of said arms and interengaging for locking the arms together and connecting the outer margins of the side plates, and cushion means bearing between the bottom and tread plates for supporting the tread plate in its floating movement.

2. In a device of the character described, the combination with a rim, an outer casing mounted upon the rim, connecting means between the outer casing and the rim, and an inner casing within the outer casing and including a bottom plate, of loops struck from the rim and tongues struck from the said plate and engaging said loops to coact with the said connecting means for holding the casings upon the rim.

3. A cushion tire including an outer casing, an inner casing therein, said inner casing including independent side plates, coacting interengaging means carried by the said plates for rigidly connecting the plates and holding the outer margins of the plates against spreading, and a tread plate mounted upon the side plates to float within the outer casing confronting the tread thereof, and cushioning means for supporting the tread plate in its floating movement.

4. A cushion tire including an outer casing, an inner casing therein, said inner casing including independent side plates, arms carried thereby, reversely presented hooks carried by the arms and interengaging with one hook of each arm overlying the other adjacent arm for rigidly connecting the plates and holding the outer margins of the plates against spreading, and a tread plate mounted upon the side plates to float within the outer casing confronting the tread thereof, and cushioning means for supporting the tread plate in its floating movement.

5. In a device of the character described, the combination with a rim, an outer casing mounted upon the rim, connecting means between the outer casing and the rim, and an inner casing within the outer casing and including a bottom plate, of connecting means formed from the rim and bottom plate respectively for holding the casings upon the rim.

6. A cushion tire including an outer casing, an inner casing therein, said inner casing including independent side plates, means extending transversely between and connecting said plates for rigidly holding the outer margins thereof against spreading, and a tread plate connected to the outer margins of the side plates, and cushion means for supporting the inner casing within the outer casing and engaged with said first mentioned means to be held thereby in active position.

In testimony whereof I affix my signature.

WALTER E. COOK. [L. S.]

Copies of this patent may be obtained for five cents each, by addressing the "Commissioner of Patents, Washington, D. C."